United States Patent Office 3,099,676
Patented July 30, 1963

3,099,676
HYDROXYALKYL POLYPHOSPHATES
William M. Lanham, Charleston, W. Va., assignor to Union Carbide Corporation, a corporation of New York
No Drawing. Filed Nov. 3, 1961, Ser. No. 149,845
8 Claims. (Cl. 260—461)

The invention relates to a process for the preparation of hydroxyalkyl phosphates and to the novel polyphosphates which are produced by the inventive process.

The reaction of vicinal epoxides with mononuclear phosphorus-containing acids, e.g., phosphoric acid, is known to yield the corresponding phosphate esters. For example, ethylene oxide reacts with the acidic hydroxyls in phosphoric acid according to the equation:

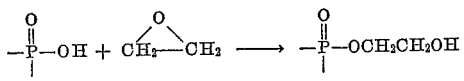

It would be expected that vicinal epoxides would react with polyphosphoric acids to also yield the corresponding esters. It has been discovered, however that the phosphate esters which are initially formed subsequently react through the terminal alcoholic groups of the ether with a

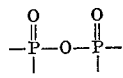

anhydride group of another molecule of polyphosphoric acid or ester thereof to produce thereby a hydroxyalkyl polyphosphate. Accordingly, the process of the invention comprises a process for the production of hydroxyalkyl polyphosphates which comprises reacting a vicinal epoxide with a polyphosphoric acid, under conditions which are fully described hereinbelow.

The hydroxyalkyl polyphosphates of the invention can be represented by Formula I (I) 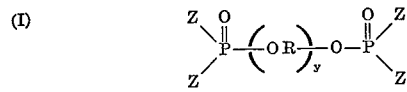

wherein R represents the divalent residue of a vicinal epoxide; wherein $y$ represents a number having a value of at least 1; and wherein each Z individually represents a group having the formula

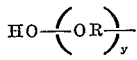

wherein the variables R and $y$ have the same significance as stated above, or a group having the formula

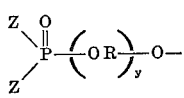

wherein the variables R, $y$, and Z have the same significance as stated above.

The various reactions which occur in the process of the invention and the molecular structure of the hydroxyalkyl polyphosphates produced thereby can be illustrated by the following sequence of reactions between ethylene oxide and pyrophosphoric acid, wherein the complex reactions which occur in the process of the invention are shown in simplified form:

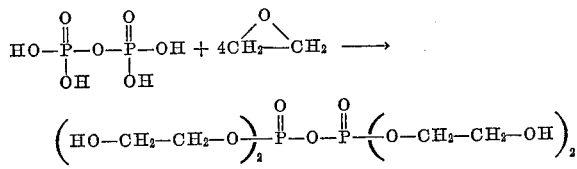

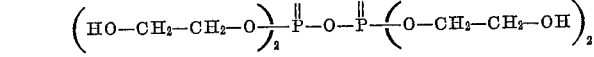

The hydroxyethyl group then reacts with a

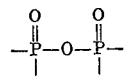

group in another molecule of either ester or acid, according to the equation

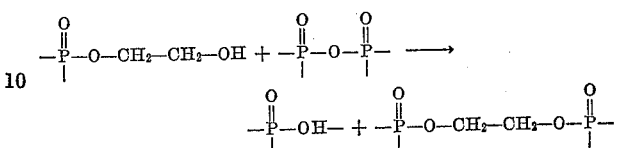

to produce a polyphosphate which contains the structural unit

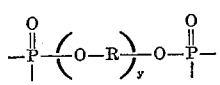

wherein R is —CH$_2$CH$_2$— and wherein $y$ is 1. The variable $y$ can be a number greater than 1, for example up to 50 or more, when addition of ethylene oxide occurs on the hydroxyethyl ester group

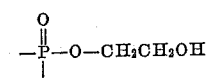

to produce a hydroxyl-terminated polyoxyethylene group

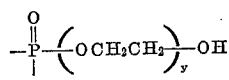

which can then react with the

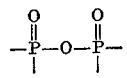

anhydride group as shown above.

Vicinal epoxide will continue to react with the acidic hydroxyl groups, i.e.,

groups, which are present in the reaction mixture. Such acidic hydroxyl groups are present in the starting polyphosphoric acid and are also produced as a product of the reaction:

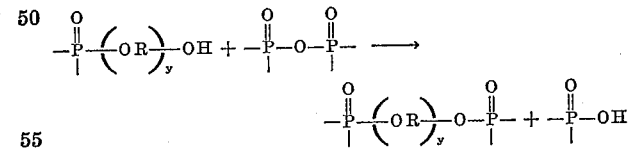

Each time a vicinal epoxide reacts with an acidic hydroxyl group, a hydroxyl-terminated ester group is produced which is capable of reacting with a

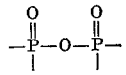

anhydride group. As a result, the reactions which occur in the process of the invention produce a complex mixture of linear and three-dimensional products which can be represented by Formula I, supra. The following illustrative reactions between ethylene oxide and pyrophosphoric acid further serve to illustrate the reactions which can occur in the process of the invention as well as some of the variations in structure of the hydroxyalkyl polyphosphates produced thereby:

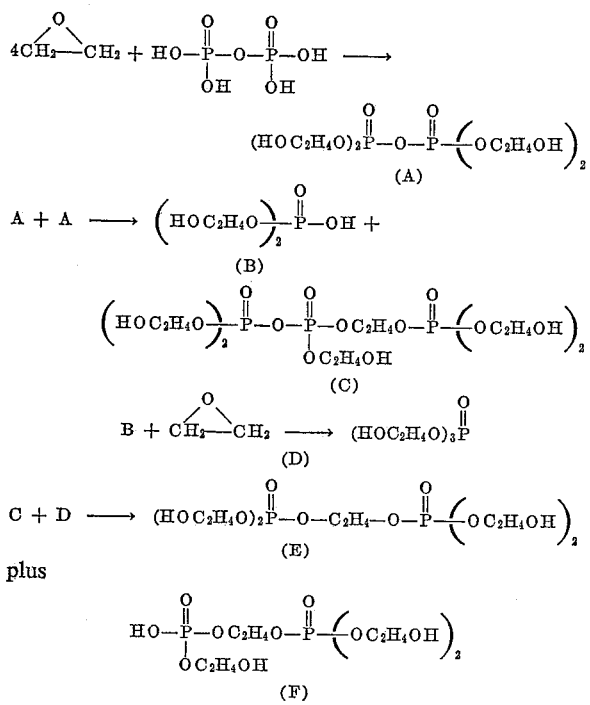

(A)

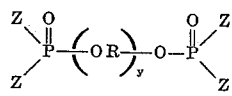

(B)

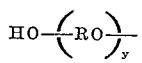

(C)

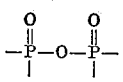

(D)

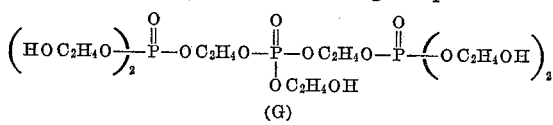

(E)

plus

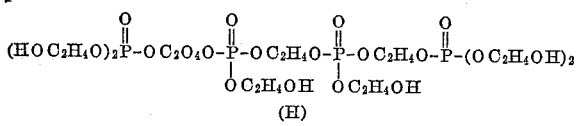

(F)

Thus compound E can be represented by Formula I (I) $$\begin{array}{c}Z\diagdown\;O\qquad\qquad O\;\diagup Z\\P-(OR)_y-O-P\\Z\diagup\qquad\qquad\diagdown Z\end{array}$$

wherein R is an ethylene group, wherein $y$ is 1, and wherein each Z is a hydroxyethyleneoxy group, i.e., the group $$HO-(RO)_y-$$

wherein R is an ethylene group and $y$ is 1. Any of the $HOC_2H_4O-$ groups in compounds E can react with a $$\begin{array}{c}O\quad\;\;O\\\|\quad\;\;\|\\-P-O-P-\\|\quad\;\;|\end{array}$$

group in another molecule of polyphosphoric acid or ester thereof and start the sequence of reactions again. For example, compound E reacting with compound C would yield a mixture of the following compositions:

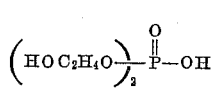

(G)

plus

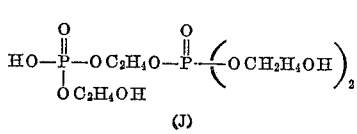

(H)

plus (HOC₂H₄O)₂P(O)-OH   (I)

plus

HO-P(O)(OC₂H₄OH)-OC₂H₄O-P(O)(OC₂H₄OH)₂   (J)

The hydroxyalkyl polyphosphates of the invention are normally mixtures of compositions which can be represented by Formula I supra, wherein each composition contains at least 2 and up to 50 or more phosphorus atoms.

The polyphosphoric acids which can be employed in the process of the invention can be represented by Formula II (II)  $mH_3PO_4-(m-1)H_2O$ wherein $m$ is a number having a value of at least 2 and up to 50 or more, and represents the number of phosphorus atoms contained in the polyphosphoric acid. Of particular value in the practice of the invention are pyrophosphoric acid, tripolyphosphoric acid, tetrapolyphosphoric acid, pentapolyphosphoric acid, mixtures thereof, and the like, and the higher polyphosphoric acids. The polyphosphoric acids usually exist in the form of an equilibrium mixture containing several of the acids. Therefore, the variable $m$ in Formula II, supra, usually represents a number which has an average value. The polyphosphoric acids employed in the invention can be prepared by methods which are known in the art, for example, by reacting phosphoric acid with appropriate quantities of water and phosphorus pentoxide.

The vicinal epoxides which can be employed in the process of the invention, either singly or in combination with each other, include those compounds that can be represented by Formula III (III) 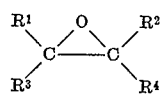

wherein the variables designated as $R^1$, $R^2$, $R^3$, and $R^4$ individually can be hydrogen, and alkyl, alkenyl, haloalkyl, haloalkenyl, aryloxyalkyl, and the like groups, and two of the variables designated as $R^1$, $R^2$, $R^3$, and $R^4$ can be taken together to form a cycloalkyl group, preferably wherein the said groups have from 1 to 10 carbon atoms. Thus in Formula I, supra, the variable R, which represents the divalent residue of a vicinal epoxide, can be represented by Formula IV (IV) 

wherein the variables $R^1$–$R^4$ have the same significance as stated above with respect for Formula III.

Representative groups of vicinal epoxides which can be employed include, among others, the alkylene oxides, the epoxyalkenes, the aliphatic haloepoxides, the aryloxy-substituted alkylene oxides, the epoxycycloalkanes, and the like, which preferably have from 2 to 12 carbon atoms. Specific examples of vicinal epoxides which can be employed include, among others, ethylene oxide, 1,2-epoxypropane, the epoxybutanes, 3,4-epoxy-1-butene, the epoxypentanes, 3,4-epoxy-1-pentene, the epoxyhexanes, the epoxyheptanes, the epoxyoctanes, the epoxynonanes, the epoxydecanes, the epoxydodecanes, 3-chloro-1,2-epoxypropane, 3-chloro-1,2-epoxybutane, 1-chloro-3,4-epoxy-1-butene, 1-chloro-2,3-epoxybutane, 3,4-dichloro-1,2-epoxybutane, 1,4-dichloro-2,3-epoxybutane, 1-chloro-2,3-epoxypentane, 4-chloro-2,3-epoxypentane, 3-chloro-1,2-epoxypentane, 1,4-dichloro-2,3-epoxypentane, 1-chloro-2,3-epoxyhexane, the chloroepoxyhexanes, the chloroepoxyheptanes, the chloroepoxyheptenes, the chloroepoxyoctanes, the chloroepoxyoctenes, the chloroepoxynonanes, the chloroepoxydecanes, 3-bromo-1,2-epoxypropane, phenyl glycidyl ether, tolyl glycidyl ether, xylyl glycidyl ether and other alkyl-substituted-phenyl glycidyl ethers, epoxycyclohexane and alkyl-substituted epoxycyclohexanes, epoxycyclopentane and alkyl-substituted epoxycyclopentanes, 2,3-epoxybicyclo[2.2.1]heptane, and the like. The preferred vicinal epoxides are the alkylene oxides such as ethylene oxide, 1,2-epoxypropane, the epoxybutanes, and the like, and the saturated aliphatic haloepoxides such as 3-chloro-1,2-epoxypropane, 3-bromo-1,2-epoxypropane, and the like. Thus, in the preferred embodiments of the invention, when an alkylene oxide is employed, Formula IV supra, can be represented in simplification by —$C_nH_{2n}$— wherein $n$ has a value of from 2 to 12; and when a saturated aliphatic haloepoxide is employed, Formula IV can be represented in simplification by —$C_nH_{2n-r}X_r$— wherein $n$ has a value of from 2 to 12, wherein $X$ is a halo group, and wherein $r$ is either 1 or 2.

It is preferred that sufficient vicinal epoxide be employed in the process of the invention to esterify substantially all of the acidic hydroxyl groups, i.e.,

groups, which are present in the reaction mixture. This includes both the acidic hydroxyls which are present in the original acid and the acidic hydroxyls which are generated as a result of the breaking of the

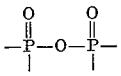

anhydride groups. Thus, the minimum quantity of vicinal epoxide that will normally be employed is $2m+1$ moles of vicinal epoxide per mole of polyphosphoric acid, wherein $m$ represents the average number of phosphorus atoms per molecule of polyphosphoric acid. Up to $12m$, and more, moles of vicinal epoxide per mole of polyphosphoric acid can be employed in the process of the invention.

The process of the invention is carried out by reacting a vicinal epoxide with a polyphosphoric acid. The reagents can be mixed together in any order, or they can be introduced concurrently into a reaction vessel. The preferred method is to add the vicinal epoxide slowly to the polyphosphoric acid, for example, over a period of from about 10 minutes to about 10 hours, and preferably from about 15 minutes to about 7 hours, and to react the resulting mixture for an additional period of, for example, from about 15 minutes to about 20 hours, and preferably from about 30 minutes to about 5 hours. The reaction temperature is dependent upon a variety of factors, such as nature and proportion of reagents, and the like, and can vary over a wide range. For example, a suitable reaction temperature can usually be found in the range of from about 0° C. to about 200° C., and preferably from about 25° C. to about 150° C. The reaction temperature can be maintained by external heating or cooling, whichever is required.

The process of the invention can be carried out with the reactants in the undiluted state or in an inert diluent, whichever is desired. Suitable inert diluents include, for example, organic esters such as ethyl acetate, butyl acetate, and the like; organic ketones such as methyl ethyl ketone, methyl isobutyl ketone, and the like; and various other organic liquids such as dioxane, tetrahydrofuran, and the like. The concentration of the reactants in the inert diluent is not critical and can vary from 10 weight percent, and lower, to 90 weight percent, and higher, based upon total weight of the reaction mixture.

The process of the invention can be carried out in conventional equipment, for example, a reaction vessel equipped with means for heat transfer, agitator, reflux and distillation, and the like. Conventional materials of construction can be employed such as stainless steel, copper, glass or glass-lined, and the like. The process can be carried out at atmospheric pressure, subatmospheric pressure, or superatmospheric pressure.

The polyphosphate products of the process of the invention can be recovered by conventional methods, for example, by distilling the reaction mixture under reduced pressure to remove inert diluent, unreacted starting material, and the like.

From the foregoing discussion it is seen that the hydroxyalkyl polyphosphates of the invention comprise the reaction product of a vicinal epoxide and a polyphosphoric acid reacted in the proportion of at least $2m+1$ moles of vicinal epoxide per mole of polyphosphoric acid wherein $m$ represents the average number of phosphorus atoms per molecule of said polyphosphoric acid. The said hydroxyalkyl polyphosphates are mixtures of compositions which contain a plurality of pentavalent phosphorus atoms, that is, at least 2 and up to 50 or more pentavalent phosphorus atoms, wherein each phosphorus atom is bonded to 1 oxo group, that is, the group O= wherein the valence bonds from the oxygen are bonded to the same atom, wherein each phosphorus atom is interconnected to at least one other phosphorus atom through an

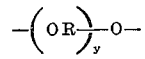

group wherein R represents the divalent residue of the said vicinal epoxide and wherein $y$ represents a number having a value of at least 1, and wherein each of the remaining valence bonds of each phosphorus atom is bonded to a group having the formula

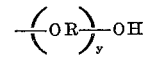

wherein R and $y$ have the same significance as stated above. The hydroxyalkyl polyphosphates of the invention are essentially free of

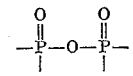

anhydride groups and acidic hydroxyl groups, that is,

groups. For example, the quantity of

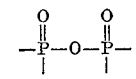

anhydride groups present in the polyphosphates of the invention will ordinarily be less than the quantity sufficient to neutralize about 0.20 cubic centimeter of standard 1 N base per gram of polyphosphate. The quantity of acidic hydroxyls present in the polyphosphates of the invention will usually be less than the quantity sufficient to neutralize about 0.10 cubic centimeter of standard 1 N base per gram of polyphosphate.

The hydroxyalkyl polyphosphates of the invention are widely useful compositions. For example, they can be reacted with organic polyisocyanates in the preparation of polyurethane products such as foams, surface coatings, adhesives, elastomers, and the like. The polyphosphates can be reacted with polyepoxide resins in the preparation of castings, laminates, molded articles, and the like. The polyphosphates can be employed as reaction intermediates in the preparation of many useful products. For example, they can be reacted with drying oil acids to prepare surface coating compositions. The polyphosphates can be reacted with monocarboxylic and dicarboxylic acids to prepare plasticizers. It is pertinent to point out that the polyphosphates of the invention impart improved flame-resistance to many of the products in which they are employed.

The following examples illustrate the practice of the invention (all temperatures indicated are centigrade):

*Example 1*

To 296 grams (3.2 moles) of 3-chloro-1,2-epoxypropane was added 35.6 grams (0.2 mole) of pyrophosphoric acid over a period of 32 minutes. The temperature of the reaction mixture was maintained at 25° C. by external cooling. After the addition, the dropping funnel which had been employed to add the pyrophosphoric acid to the reaction mixture was washed with 27 grams of 3-chloro-1,2-epoxypropane, which was then added to the reaction mixture. Intermittent cooling was necessary for the next two hours in order to maintain the reaction temperature below 30° C. After standing overnight, the reaction mixture was stripped at 56° C. at an absolute pressure of less than 0.2 millimeter of mercury. The residue product weighed 228 grams and was a clear viscous liquid with refractive index $n\ 30/D=1.5552$.

*Example 2*

Four hundred and forty-one grams (4.77 moles) of 3-chloro-1,2-epoxypyropane was added to a one-liter, 4-neck glass flask equipped with thermometer, stirrer, reflux condenser, and dropping funnel. To the stirred liquid in the flask was added dropwise 59 grams (0.3 mole) of molten pyrophosphoric acid over a period of 15 minutes. Cooling was necessary during the addition and for about 1.5 hours thereafter in order to maintain the reaction temperature at 25° C. After the reaction period, the contents of the flask were stripped at 56° C. at an absolute pressure of less than 0.2 millimeter of mercury. A falling film still was employed for the stripping operation. The clear liquid residue product weighed 369.5 grams and had a refractive index $n\ 30/D=1.4952$ and an acidity of 0.009 of N base/gram.

*Example 3*

To 178 grams (1.0 mole) of pyrophosphoric acid was added 1480 grams (16 moles) of 3-chloro-1,2-epoxypropane over a period of 70 minutes. Cooling was necessary during the first half of this addition in order to maintain the temperature of the agitated reaction mixture at 100° C. Heat was applied during the second half of the addition in order to maintain the reaction temperature at 100° C. After the addition, the reaction mixture was kept at 100° C. for 4 more hours, after which time the mixture was stripped at 100° C. and an absolute pressure of less than 2 millimeters of mercury. The residue product was a light brown viscous liquid, and weighed 854 grams, which indicated that 7.3 moles of the epoxide had reacted with 1 mole of pyrophosphoric acid. The product had a refractive index $n\ 30/D=1.4982$ and an acidity of 0.010 cc. of N base/gram. Infrared spectra analysis indicated that no

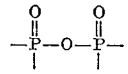

anhydride groups were present. Elemental analysis was as follows:

|    | Found, Wt. Percent | Theory, Wt. Percent |
|----|---------------------|----------------------|
| Cl | 30.03               | 30.35                |
| C  | 31.13               | 30.84                |
| H  | 4.79                | 4.31                 |
| P  | 7.35                | 7.26                 |

The hydroxyl number of the polyphosphate product was 282.8.

*Example 4*

Propylene oxide (464 grams, 8 moles) was added dropwise to 89 grams (0.5 mole) of pyrophosphoric acid over a period of 50 minutes. Cooling was necessary during the addition and for 10 minutes thereafter to maintain the reaction mixture at 100° C. The reaction mixture was then refluxed for 0.5 hour, and then allowed to stand overnight at 25° C. The reaction mixture was then stripped at 100° C. and an absolute pressure of less than 2 millimeters of mercury. The liquid residue product had the following properties: refractive index $n\ 30/D=$ 1.4560; acidity=0.001 cc. of N base/gram; hydroxyl number=346;

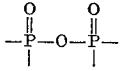

analysis=0.007 cc. of N base/gram. Elemental analysis was as follows:

*Example 5*

|   | Found, Wt. Percent | Theory, Wt. Percent |
|---|---------------------|----------------------|
| P | 9.14                | 9.18                 |
| C | 45.59               | 45.62                |
| H | 8.40                | 8.26                 |

Tripolyphosphoric was prepared according to the equation:

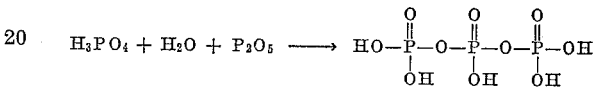

To 348 grams of 84.5 weight percent aqueous phosphoric acid (3 moles of $H_3PO_4$, 3 moles of $H_2O$) was added, spatulawise, 426 grams (3 moles) of phosphorus pentoxide. The addition took 43 minutes and cooling of the agitated solution was necessary in order to keep the reaction temperature at 80° C. Heat was applied after the addition was complete, and the reaction mixture was stirred at 80° C. for an additional 7 hours. The tripolyphosphoric acid product was a clear, pale yellow, viscous liquid.

*Example 6*

To 200 grams of the tripolyphosphoric acid prepared in Example 5 was added 902 grams of 1,2-epoxypropane over a period of 6.25 hours. During most of the addition period, the reaction temperature was 100° C., but dropped off to 46° C. toward the end of the period. After the addition, the reaction mixture was stripped at 100° C. and an absolute pressure of less than 2 millimeters of mercury. The residue product was filtered hot to yield 730 grams of a dark brown viscous liquid. The properties of the polyphosphate were as follows: refractive index $n\ 30/D=1.4582$; acidity=0.002 cc. N base/gram;

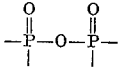

analysis was 0.04 cc. N base/gram although infrared spectra showed no evidence of

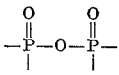

groups; hydroxyl number=326.8. Elemental analysis was as follows:

|   | Found, Wt. Percent | Theory, Wt. Percent |
|---|---------------------|----------------------|
| C | 45.06               | 45.04                |
| H | 8.28                | 8.09                 |

*Example 7*

Tetrapolyphosphoric acid was prepared according to the equation:

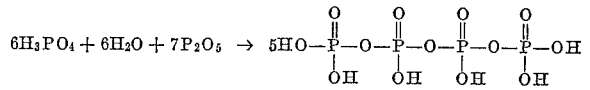

To 348 grams of 84.5 percent aqueous $H_3PO_4$ (3 moles of $H_3PO_4$; 3 moles of $H_2O$) was added, spatulawise, 497 grams (3.5 moles) of phosphorus pentoxide. The stirred reaction mixture was cooled in order to maintain the temperature at 80°. After the addition, heat was supplied and the reaction mixture stirred an additional 5 hours while maintaining a kettle temperature of 80°. The 845 grams of pale yellow, viscous liquid residue product had the following properties: refractive index n 30/D=1.4703; percent purity by acid titration=99.9.

*Example 8*

To 200 grams of tetrapolyphosphoric acid, prepared in Example 7, was added dropwise 1315 grams 14.2 moles of 3-chloro-1,2-epoxypropane. This addition was made in 1.5 hours and during the first hour cooling was necessary to maintain a reaction temperature of 100° while heat was supplied during the last 0.5 hour. After the addition the reaction mixture was maintained at 100° for an additional two hours, then stripped at 115° C. under less than 2 millimeters of mercury. The 882 grams of dark brown, viscous residue product had the following properties: refractive index n 30/D=1.5012; acidity= 0.03 cc. N base/gram; hydroxyl number=245.1. Elemental analysis was as follows:

|   | Found, Wt. Percent | Theory, Wt. Percent |
|---|---|---|
| C | 29.40 | 30.08 |
| H | 5.08 | 4.61 |
| P | 8.52 | 8.32 |
| Cl | 29.48 | 29.60 |

*Example 9*

To two hundred grams of the tetrapolyphosphoric acid prepared in Example 7 was added, dropwise, 826 grams 1,2-epoxypropane. During the first four hours of the addition it was necessary to cool the reaction mixture in order to maintain a reaction temperature of 100° C. During the last hour of the addition (total=5 hours) heat was supplied. The reaction mixture was stripped at 100° under less than 2 millimeters of mercury, filtered, and 692.5 grams of a brown viscous residue product with the following properties was obtained: Refractive index n 30/D=1.4574; acidity=0.001 cc. of N base/gram; hydroxyl number=316.3;

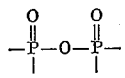

anhydride group analysis=0.01 cc. N base/gram. Elemental analysis was as follows:

|   | Found, Wt. Percent | Theory, Wt. Percent |
|---|---|---|
| C | 43.80 | 44.05 |
| H | 8.46 | 7.92 |
| P | 10.68 | 10.59 |

*Example 10*

Into 200 grams of tripolyphosphoric acid was slowly diffused ethylene oxide over a period of one hour while maintaining a reaction temperature of 25°. Since the reaction mixture was very viscous, the reaction temperature was raised to 100° and ethylene oxide added over a period of 19 hours. The reaction mixture was then stripped at 100° under less than 2 mm. of mercury. The brown viscous liquid product weighed 759 grams and was found to have the following properties: Refractive index n 30/D=1.4731; acidity=0.001 cc. N base/gram

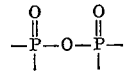

anhydride analysis=nil; hydroxyl number=286. Elemental analysis was as follows:

|   | Found, Wt. Percent | Theory, Wt. Percent |
|---|---|---|
| C | 39.35 | 40.29 |
| H | 7.78 | 7.27 |

*Example 11*

To 258 grams of tripolyphosphoric acid was added 1248 grams of 3-chloro-1,2-epoxypropane over a period of 1.5 hours. The reaction was very exothermic during most of the addition and cooling was necessary in order to maintain a reaction temperature of 100° (after approximately 950 grams of the epoxide had been added it was then necessary to supply heat in order to maintain a reaction temperature of 100°). After the addition, the reaction mixture was heated at 100° for 0.5 hour, allowed to stand overnight at 25°, and then stripped at 100° under less than 2 millimeters of mercury. The clear, brown viscous liquid residue weighed 1142 grams and was found to have the following properties: Refractive index n 30/D=1.5020; acidity=0.022 cc. of N base/gram; hydroxyl number=249; infrared spectra showed no evidence of

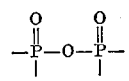

anhydride groups. Elemental analysis was as follows:

|   | Found, Wt. Percent | Theory, Wt. Percent |
|---|---|---|
| C | 30.13 | 30.12 |
| Cl | 27.56 | 29.64 |
| H | 4.71 | 4.65 |
| P | 8.09 | 8.14 |

*Example 12*

The reactants in this example are the same as those in Example 11 but the mode of addition is reversed.

To 648 grams of 3-chloro-1,2-epoxypropane was added 102.5 grams of tripolyphosphoric acid over a period of 50 minutes. The reaction was exothermic and cooling was necessary in order to maintain a reaction temperature of 100°. After the addition, the reaction mixture was kept at 100° for 6 hours and then stripped at 100° under less than 2 millimeters of mercury. The clear, yellow, viscous residue weighed 524.5 grams and was found to have the following properties: Refractive index n 30/D= 1.5020; acidity=0.001 cc. of N base/gram; hydroxyl number=232; infrared spectra showed no evidence of

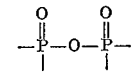

anhydride groups. Elemental analysis was as follows:

|   | Found, Wt. Percent | Theory, Wt. Percent |
|---|---|---|
| C | 31.26 | 31.28 |
| Cl | 30.89 | 30.79 |
| H | 4.85 | 4.76 |
| P | 7.02 | 7.04 |

*Example 13*

To a 2-liter, 4-necked reaction flask equipped with thermometer, stirrer, reflux condenser, and dropping funnel, was added 258 grams of tripolyphosphoric acid. While the reaction mixture was maintained at 80° C., 185 grams of 3-chloro-1,2-epoxypropane was added dropwise over a period of 45 minutes. The resulting polyphosphate was stirred at 80° C. for one hour, and then allowed to sand overnight. Over a period of 6 hours, 907 grams of propylene oxide was added to the reaction mixture. The addition was started at 80° C., and the reaction temperature gradually fell to 55° C. The product was refluxed for 2 hours at 55° C. and then stripped at 100° C. and 0.2 millimeter of mercury absolute pressure. The polyphosphate product had the following properties: Refractive index $n$ 30/D=1.4663; hydroxyl number=284–289. Elemental analysis was as follows:

|    | Found, Wt. Percent | Theory, Wt. Percent |
|----|--------------------|--------------------|
| C  | 41.56              | 41.72              |
| Cl | 7.09               | 7.10               |
| H  | 7.52               | 7.31               |
| P  | 9.39               | 9.31               |

*Example 14*

Following the same general procedure described in Example 13, a polyphosphate was prepared from the following components:

| | Grams |
|---|---|
| Tripolyphosphoric acid | 127 |
| 3-bromo-1,2-epoxypropane | 135 |
| 1,2-epoxypropane | 371 |

The resulting polyphosphate product had the following properties: Refractive index $n$ 30/D=1.4740. Elemental analysis was as follows:

|    | Found, Wt. Percent | Theory, Wt. Percent |
|----|--------------------|--------------------|
| C  | 37.08              | 38.28              |
| H  | 6.74               | 6.70               |
| Br | 14.19              | 14.75              |

*Example 15*

This example illustrates the utility of the hydroxyalkyl polyphosphates of the invention in the preparation of polyurethane foamed reaction products. A rigid foam was prepared from the following formulation:

| | Grams |
|---|---|
| "Niax" Triol 380 [1] | 93.0 |
| The polyphosphate of Example 2 | 61.3 |
| Fluorotrichloromethane | 41.0 |
| L-520 emulsifier [2] | 1.3 |
| Dibutyltin dilaurate | 0.9 |
| Toluene diisocyanate [3] | 69.7 |

[1] A mixture of (a) the propylene oxide adduct of tris-(hydroxyphenyl) propane having a hydroxy number of 250 and (b) the propylene oxide adduct of glycerine having a hydroxyl number of 633, in the proportion such that the hydroxyl number of the mixture is 380.
[2] A polysiloxane-polyoxyalkylene block copolymer prepared in accordance with the disclosure in U.S. Patent No. 2,834,748.
[3] An 80–20 weight percent mixture of 2,4- and 2,6-tolylene-diisocyanate.

The foam was prepared by the one-shot technique. The polyphosphate of Example 2 was added to the "Niax" triol–380. This mixture was thoroughly blended with the fluorotrichloromethane, L–520 emulsifier, and dibutyltin dilaurate. When the blend was thoroughly mixed, the toluene diisocyanate was added with vigorous stirring. The mixture was then transferred to a wax-coated mold and was given a ten-minute cure at 70° C. after the foam had reached maximum expansion.

The above-described foam had a density of 2.7 pounds per cubic foot and was rated self-extinguishing by flammability test ASTM D–20.

What is claimed is:

1. A hydroxyalkyl polyphosphate that is represented by the formula

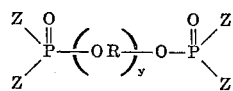

wherein R represents the divalent residue of a vicinal epoxide, wherein $y$ represents a number that has a value of at least 1, and wherein each Z individually represents a group selected from the class consisting of

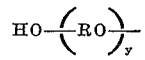

wherein R and $y$ have the significance stated above, and

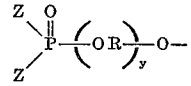

wherein the variables Z, R, and $y$ have the significance stated above.

2. A hydroxyalkyl polyphosphate that is represented by the formula

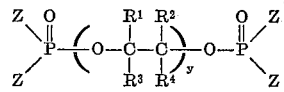

wherein the variables $R^1$, $R^2$, $R^3$, and $R^4$ individually represent groups selected from the class consisting of hydrogen, alkyl, alkenyl, chloroalkyl, bromoalkyl, chloroalkenyl, phenyloxyalkyl, and two of the variables $R^1$–$R^4$ taken together to form a cycloalkyl; wherein $y$ represents a number which has a value of at least 1, and wherein each Z individually represents a member selected from the class consisting of groups which are represented by the formulas

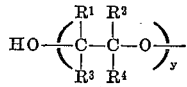

wherein the variables designated as $y$, $R^1$, $R^2$, $R^3$, and $R^4$ have the significance stated above, and

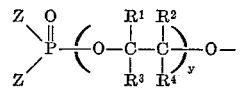

wherein the variables $y$, Z, $R^1$, $R^2$, $R^3$, and $R^4$ have the significance stated above.

3. A hydroxyalkyl polyphosphate that is represented by the formula

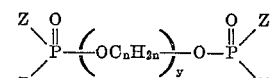

wherein $n$ represents a number having a value of from 2 to 12, wherein $y$ represents a number having a value of at least 1, and wherein each Z individually represents a member selected from the class consisting of groups which are represented by the formulas

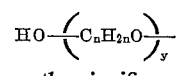

wherein $n$ and $y$ have the significance stated above, and

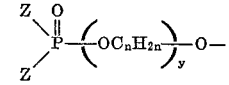

wherein Z, $n$, and $y$ have the significance stated above.

4. A hydroxyalkyl polyphosphate that is represented by the formula

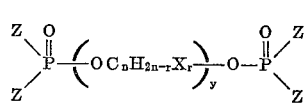

wherein $n$ represents a number having a value of from 2 to 12, wherein $r$ represents a number having a value of from 1 to 2, wherein $y$ represents a number having a value of at least 1, wherein X represents a halo group, and wherein each Z individually represents a member selected from the class consisting of groups which are represented by the formulas

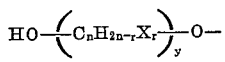

wherein $n$, $r$, $X$, and $y$ have the significance stated above, and

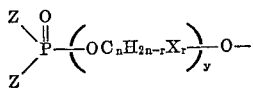

wherein $n$, $r$, $X$, $y$, and $Z$ have the significance stated above.

5. A hydroxyethyl polyphosphate that is represented by the formula

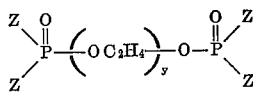

wherein $y$ represents a number having a value of at least 1, and wherein each $Z$ individually represents a member selected from the class consisting of groups that are represented by the formulas

wherein $y$ has the significance stated above, and

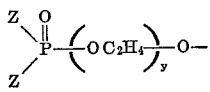

wherein $Z$ and $y$ have the significance stated above.

6. A hydroxypropyl polyphosphate that is represented by the formula

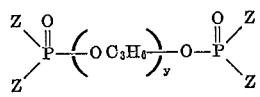

wherein $y$ represents a number having a value of at least 1, and wherein each $Z$ individually represents a member selected from the class consisting of groups that are represented by the formulas

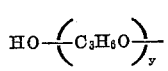

wherein $y$ has the significance stated above, and

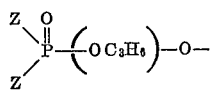

wherein $Z$ and $y$ have the significance stated above.

7. A hydroxychloropropyl polyphosphate that is represented by the formula

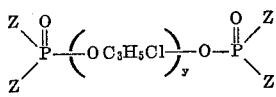

wherein $y$ represents a number having a value of at least 1, and wherein each $Z$ individually represents a member selected from the class consisting of groups that are represented by the formulas

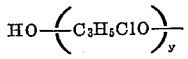

wherein $y$ has the significance stated above, and

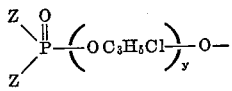

wherein $Z$ and $y$ have the significance stated above.

8. A composition of matter which comprises a hydroxyalkyl polyphosphate that is composed of a plurality of pentavalent phosphorus atoms, wherein each of said phosphorus atoms is bonded to one oxo group, wherein each phosphorus atom is interconnected to at least one other phosphorus atom through a group that is represented by the formula

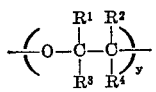

wherein each of the variables designated as $R^1$, $R^2$, $R^3$, and $R^4$ represents a member selected from the group consisting of hydrogen, alkyl, alkenyl, chloroalkyl, bromoalkyl, chloroalkenyl, phenyloxyalkyl and two of the variables designated as $R^1$–$R^4$ taken together to form a cycloalkyl group, and wherein $y$ represents a number having a value of at least 1, and wherein each of the remaining valence bonds of each phosphorus atom is bonded to a group that is represented by the formula

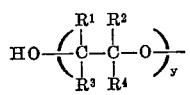

wherein the variables $R^1$, $R^2$, $R^3$, $R^4$, and $y$ have the significance stated above.

References Cited in the file of this patent
UNITED STATES PATENTS

| | | |
|---|---|---|
| 2,177,984 | Harris | Oct. 31, 1939 |
| 2,466,393 | Dickey et al. | Apr. 5, 1949 |
| 2,466,394 | Dickey et al. | Apr. 5, 1949 |